United States Patent
Palle et al.

(10) Patent No.: US 11,082,245 B2
(45) Date of Patent: Aug. 3, 2021

(54) MULTICAST (P2MP) SUPPORT FOR PATH COMPUTATION ELEMENT CENTRAL CONTROLLER (PCECC)

(71) Applicant: HUAWEI TECHNOLOGIES CO., LTD., Shenzhen (CN)

(72) Inventors: Udayasree Palle, Bangalore (IN); Dhruv Dhody, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/930,451

(22) Filed: May 13, 2020

(65) Prior Publication Data
US 2020/0295958 A1    Sep. 17, 2020

Related U.S. Application Data

(63) Continuation of application No. 16/171,320, filed on Oct. 25, 2018, now Pat. No. 10,805,098, which is a (Continued)

(30) Foreign Application Priority Data

Apr. 25, 2016 (IN) .............. 201641014323

(51) Int. Cl.
*H04L 12/18* (2006.01)
*H04L 12/761* (2013.01)
(Continued)

(52) U.S. Cl.
CPC .............. *H04L 12/18* (2013.01); *H04L 45/16* (2013.01); *H04L 45/50* (2013.01); *H04L 45/741* (2013.01)

(58) Field of Classification Search
CPC ....... H04L 12/18; H04L 45/741; H04L 45/50; H04L 45/16
See application file for complete search history.

(56) References Cited

U.S. PATENT DOCUMENTS 8,953,500 B1 * 2/2015 Shen .................. H04L 45/16
                                                    370/256
2010/0208733 A1   8/2010 Zhao et al.
(Continued)

FOREIGN PATENT DOCUMENTS

CN    102308519 A    1/2012
CN    104429021 A    3/2015

OTHER PUBLICATIONS

Q. Ed. Zhao: "RFC 6006—Extensions to the Path Computation Element Communication Protocol (PCEP) for Point-to-Multipoint Traffic Engineering Label Switched Paths", IETF, Sep. 30, 2010, XP055131174, 66 pages.
(Continued)

*Primary Examiner* — Hashim S Bhatti

(57) ABSTRACT

Disclosed is a mechanism that provides the extensions of PCEP message and the objects to support PCECC with P2MP capability in downloading the labels for branch node of P2MP TE LSPs. In one implementation, various embodiments provide an apparatus, a system, a node and a method that receives a PCLabelUpd message with all the extensions and the objects to support PCECC with P2MP capability, detects the object and identifies that the label download is for P2MP TE LSP and for this LSP. In those embodiments, the apparatus/the system/the node acts as a branch node, and thereby the apparatus/the system/the node downloads all the labels specified in the object to data plane with respect to any existing branch node download mechanism for a P2MP TE LSP.

30 Claims, 6 Drawing Sheets

Related U.S. Application Data continuation of application No. PCT/CN2016/107976, filed on Nov. 30, 2016.

(51) Int. Cl.
   *H04L 12/723*   (2013.01)
   *H04L 12/749*   (2013.01)

(56) References Cited

U.S. PATENT DOCUMENTS

| | | |
|---|---|---|
| 2013/0100953 A1 | 4/2013 | Li et al. |
| 2014/0003229 A1 | 1/2014 | Gandhi et al. |
| 2015/0103844 A1 | 4/2015 | Zhao et al. |
| 2015/0304209 A1 | 10/2015 | Choudhury et al. |
| 2016/0006609 A1 | 1/2016 | Zhao |
| 2016/0006614 A1 | 1/2016 | Zhao |

OTHER PUBLICATIONS

Aires, Buenos 5, The Role of the Path Computation Element Centralized Controller in SDN & NFV, Software Defined Networking (sdnrg) RG, Apr. 4, 2016, 23 pages.
E. Crabbe et al, PCEP Extensions for Stateful PCE draft-ietf-pce-stateful-pce-13, Dec. 1, 2015, 51 pages.
U. Palle et al, PCEP Extensions for PCE-initiated Point-to-Multipoint LSP Setup in a Stateful PCE Model draft-palle-pce-stateful-pce-initiated-p2mp-lsp-06, Jun. 29, 2015, 14 pages.
U. Palle et al, Path Computation Element (PCE) Protocol Extensions for Stateful PCE usage for Point-to-Multipoint Traffic Engineering Label Switched Paths draft-palle-pce-stateful-pce-p2mp-07, Jun. 29, 2015, 26 pages.
Q. Zhao et al, PCEP Procedures and Protocol Extensions for Using PCE as a Central Controller (PCECC) of LSPs draft-zhao-pce-pcep-extension-for-pce-controller-02. Oct. 7, 2015, 30 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                           Out label                            |
|                                                                |
+-+-+-+-+-+-+-+-+-+-+-+-+-+-+-+-+-+-+-+-+-+-+-+-+-+-+-+-+-+-+-+-+
|                       nexthop IPv4 address                     |
|                                                                |
+-+-+-+-+-+-+-+-+-+-+-+-+-+-+-+-+-+-+-+-+-+-+-+-+-+-+-+-+-+-+-+-+
~                              ...                               ~
~                                                                ~
+-+-+-+-+-+-+-+-+-+-+-+-+-+-+-+-+-+-+-+-+-+-+-+-+-+-+-+-+-+-+-+-+
|                           Out label                            |
|                                                                |
+-+-+-+-+-+-+-+-+-+-+-+-+-+-+-+-+-+-+-+-+-+-+-+-+-+-+-+-+-+-+-+-+
|                       nexthop IPv4 address                     |
|                                                                |
+-+-+-+-+-+-+-+-+-+-+-+-+-+-+-+-+-+-+-+-+-+-+-+-+-+-+-+-+-+-+-+-+
```

FIGURE 1 (a)

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         Out label                             |
|                                                               |
+-+-+-+-+-+-+-+-+-+-+-+-+-+-+-+-+-+-+-+-+-+-+-+-+-+-+-+-+-+-+-+-+
|                         Node-ID                               |
+-+-+-+-+-+-+-+-+-+-+-+-+-+-+-+-+-+-+-+-+-+-+-+-+-+-+-+-+-+-+-+-+
|                       Interface ID                            |
+-+-+-+-+-+-+-+-+-+-+-+-+-+-+-+-+-+-+-+-+-+-+-+-+-+-+-+-+-+-+-+-+
~                           ...                                 ~
~                                                               ~
+-+-+-+-+-+-+-+-+-+-+-+-+-+-+-+-+-+-+-+-+-+-+-+-+-+-+-+-+-+-+-+-+
|                         Out label                             |
|                                                               |
+-+-+-+-+-+-+-+-+-+-+-+-+-+-+-+-+-+-+-+-+-+-+-+-+-+-+-+-+-+-+-+-+
|                         Node-ID                               |
+-+-+-+-+-+-+-+-+-+-+-+-+-+-+-+-+-+-+-+-+-+-+-+-+-+-+-+-+-+-+-+-+
|                       Interface ID                            |
+-+-+-+-+-+-+-+-+-+-+-+-+-+-+-+-+-+-+-+-+-+-+-+-+-+-+-+-+-+-+-+-+
```

FIGURE 1 (c)

MULTICAST (P2MP) SUPPORT FOR PATH COMPUTATION ELEMENT CENTRAL CONTROLLER (PCECC)

CROSS-REFERENCE TO RELATED APPLICATIONS

This application is a continuation of U.S. application Ser. No. 16/171,320, filed on Oct. 25, 2018, which is a continuation of International Application No. PCT/CN2016/107976, filed on Nov. 30, 2016, which claims priority to Indian Patent Application No. 201641014323, filed on Apr. 25, 2016. All of the aforementioned applications are hereby incorporated by reference in their entireties.

TECHNICAL FIELD

The present subject matter described herein, in general, relates to computer networking, and more particularly, to providing traffic engineering within a network.

BACKGROUND

In computer networks, a Path Computation Element (PCE) is a system component, application, or network node that is capable of determining and finding a suitable route for conveying data between a source and a destination. As well known in the art that routing can be subject to a set of constraints, such as Quality of Service (QoS), policy, or price. Constraint-based path computation is a strategic component of Traffic Engineering (TE) in Multiple protocol Label Switching (MPLS) and Generalized Multiprotocol Label Switching (GMPLS) networks. It is used to determine the path through the network that traffic should follow, and provides the route for each Label Switched Path (LSP) that is set up. Path computation has previously been performed either in a management system or at the head end of each LSP. But path computation in large, multi-domain networks may be very complex and may require more computational power and network information than is typically available at a network element, yet may still need to be more dynamic than can be provided by a management system. Thus, a PCE is an entity capable of computing paths for a single or set of services. A PCE might be a network node, network management station, or dedicated computational platform that is resource-aware and has the ability to consider multiple constraints for sophisticated path computation. PCE applications compute label switched paths for MPLS and GMPLS traffic engineering. The various components of the PCE architecture are in the process of being standardized by the IETF's PCE Working Group.

Conventionally know stateless PCE provides mechanisms to perform path computations to a Path Computation Client (PCC) requests. PCC is any client application requesting a path computation to be performed by a PCE. The stateless PCE utilizes only the TE link information database to do this computation. Also, along with network state traffic engineering database (TEDB), a stateful PCE stores the state of all the computed paths or LSPs and the associated resources an LSP database (LSPDB). The stateful PCE's are of two types: passive stateful PCE and active stateful PCE. The passive stateful PCE uses the TEDB and LSPDB while path computation is done only when requested by PCC. The active stateful PCE allows the LSP to be delegated to the PCE where PCE becomes the owner of the LSP and can change any attribute of the LSP at anytime. PCE can control the LSPs and provide the path to the PCC which continue to use Resource Reservation Protocol (RSVP) to signal the path.

The Path Computation Element Protocol (PCEP) enables communications between a PCC and a PCE, or between two PCEs. PCEP is a TCP-based protocol defined by the IETF PCE Working Group, and defines a set of messages and objects used to manage PCEP sessions and to request and send paths for multi-domain traffic engineered LSPs (TE LSPs). It provides a mechanism for a PCE to perform path computation for a PCC's external LSPs. The PCEP interactions include LSP status reports sent by the PCC to the PCE, and PCE updates for the external LSPs.

PCE Central Controller (PCECC) solution allow for a dynamic MPLS network that is eventually controlled and deployed without the deployment of RSVP-TE protocol while providing all the key MPLS functionalities needed by the service providers, i.e., there is no change in MPLS forwarding mechanism. The PCECC allocates and downloads the label entries along the LSP. The rest of processing is similar to the existing stateful PCE mechanism.

However, the I-D.zhao-pce-pcep-extension-for-pce-controller draft does not support in downloading the labels for branch node of Point-to-Multipoint Traffic Engineering Label Switch Path (P2MP TE LSPs). This leads to a problem that the current node that is downloading the label in data plane cannot download the required branch labels to appropriate forwarding information base (FIB) tables.

The above-described deficiencies of today's traffic engineering within a network are merely intended to provide an overview of some of the problems of conventional techniques, and are not intended to be exhaustive. Other problems with conventional techniques and corresponding benefits of the various non-limiting embodiments described herein may become further apparent upon review of the following description.

SUMMARY

This summary is provided to introduce concepts related to multicast (P2MP) support for path computation element central controller (PCECC), and the same are further described below in the detailed description. This summary is not intended to identify essential features of the claimed subject matter nor is it intended for use in determining or limiting the scope of the claimed subject matter.

A main objective of the present invention is to solve the technical problem as recited above by focusing on PCEP extensions for PCECC with P2MP capability in downloading the labels for branch node of P2MP TE LSPs.

Another object of the present invention is to provide a mechanism that provides the extensions of PCEP message and the objects to support PCECC with P2MP capability in downloading the labels for branch node of P2MP TE LSPs.

Accordingly, in one implementation, the present invention provides an apparatus, a system, a node and a method that receives a PCLabelUpd message with all the extensions and the objects to support PCECC with P2MP capability, detects the object and identifies that the label download is for P2MP TE LSP and for this LSP, the apparatus/the system/the node acts as a branch node, and thereby the apparatus/the system/the node downloads all the labels specified in the object to data plane with respect to any existing branch node download mechanism for a P2MP TE LSP In contrast to the prior-art techniques, the present invention by an apparatus, a node, and a method provides PCEP Extensions to support PCECC with P2MP capability in downloading the labels for the branch node of P2MP TE LSPs by using extension of PCLabelUpd message and by using a new object.

The various options and preferred embodiments referred to above in relation to the first implementation are also applicable in relation to the other implementations.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
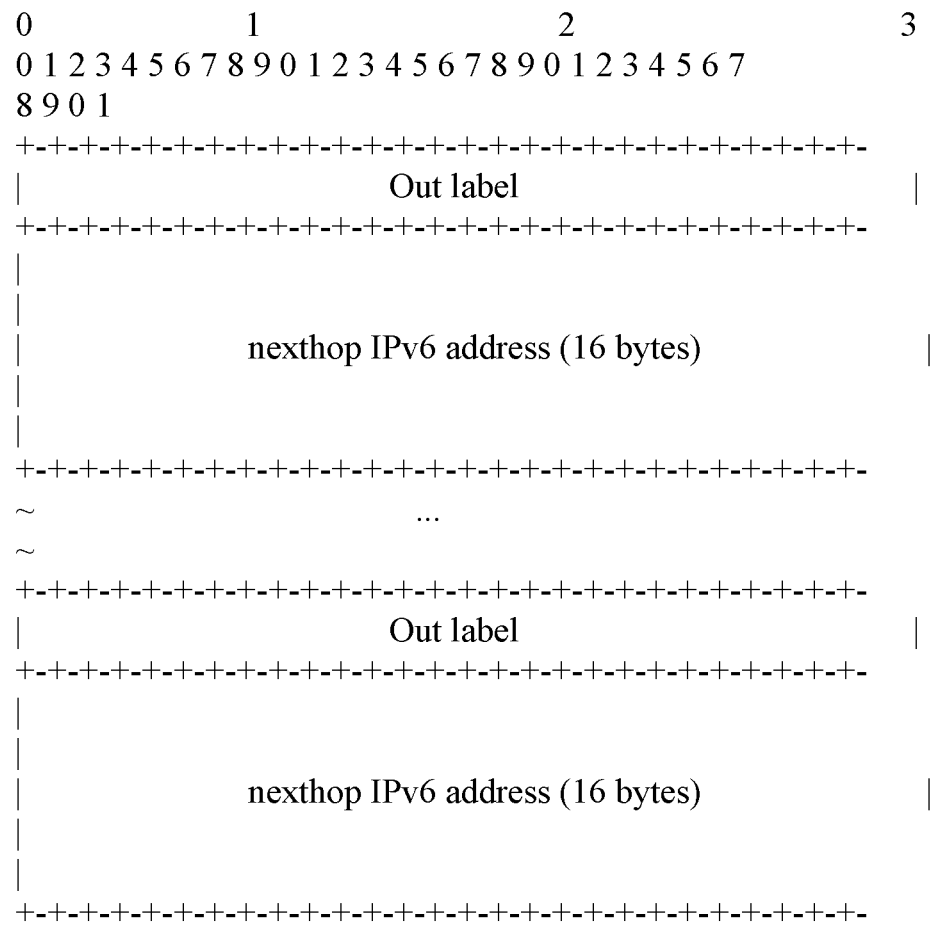
FIG. 1(a), FIG. 1(b), and FIG. 1(c) illustrates a format of the new object body for IPv4, IPv6, and unnumbered, respectively, in accordance with an embodiment of the present subject matter.

It is to be understood that the attached drawings are for purposes of illustrating the concepts of the invention and may not be to scale.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention provides PCEP extensions for PCECC with P2MP capability in downloading the labels for branch node of P2MP TE LSPs.

Accordingly, in one implementation, a node or a PCC receives a PCLabelUpd message with all the extensions and a new object. The node or the PCC detects the new object and identifies that the label download is for P2MP TE LSP and for this LSP act a branch node. The node or the PCC then downloads all the labels specified in the new object to data plane with respect to any existing branch node download mechanism for a P2MP TE LSP. Upon downloading, the multicast MPLS packets are forwarded successfully from source to all destinations of a P2MP TE LSP.

In one implementation, the labels referred in this document are MPLS labels. The MPLS packet use MPLS label to forward the packet to next hop. All point-to-point (P2P) and point-to-multipoint (P2MP) LSPs are setup by downloading the labels in a data plane along the path computed from source to destination in an MPLS network. For example, RSVP-TE protocol signaling mechanism allocates and downloads the labels at each node along the path computed from source to destination in an MPLS network. However, in the present invention, PCECC allocates the labels and downloads using PCEP protocol at each node along the path computed by PCECC from source to destination in the MPLS network.

In one implementation, the labels that are needed to download to data plane are carried in PCLabelUpd message. The PCLabelUpd message format specifies the labels and the corresponding action (a BRANCH label) for a P2MP TE LSP.

In one implementation, the P2MP TE LSPs are setup by allocating and downloading the labels. When labels are downloaded successfully at each node along the path, then the P2MP TE LSP is UP and forwards the packets successfully from source to destination.

An apparatus, a node, a PCC and a method the focuses on PCEP extensions for PCECC with P2MP capability in downloading the labels for branch node of P2MP TE LSPs are disclosed.

While aspects are described for PCEP extensions for PCECC with P2MP capability in downloading the labels for branch node of P2MP TE LSPs, the present invention may be implemented in any number of different computing systems, environments, and/or configurations, the embodiments are described in the context of the following exemplary systems, apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Conventionally, the PCLabelUpd message is used to download label of a TE LSP, the present invention extends the PCLabelUpd message in downloading the labels for the branch node of a P2MP TE LSP.

In one implementation, a comparison of the original the PCLabelUpd message format and the format of PCLabelUpd message according to the present invention is as follows:

```
Original format [Prior-art]:
<PCLabelUpd Message> ::= <Common Header>
                            <pce-label-update-list>
    Where:
    <pce-label-update-list> ::= <pce-label-update> [<pce-label-update-list>]
    <pce-label-update> ::= (<pce-label-download>|<pce-label-map>)
    Where:
    <pce-label-download> ::= <SRP> <LSP>   <label-list>
    <pce-label-map>      ::= <SRP>  <LABEL>  <FEC>
    <label-list >  ::=   <LABEL>   [<label-list>]
Extension format [Present invention]:
<PCLabelUpd Message> ::= <Common Header>
                            <pce-label-update-list>
    Where:
    <pce-label-update-list> ::= <pce-label-update>
                    [<pce-label-update-list>]
    <pce-label-update> ::= (<pce-1label-download>|<pce-label-map>)
    Where:
    <pce-label-download> ::= <SRP>
                        <LSP>
               (<label-list> | <LABEL> <BRANCH>)
    <pce-label-map>      ::= <SRP>
                        <LABEL>
                        <FEC>
where
    <label-list >  ::=   <LABEL>   [<label-list>]
```

In one implementation, the new object is used to encode more than one outgoing label associated with a next hop address of a branch node.

Referring now to FIG. 1(a) a format of new objects referred to as a branch object body for IPv4 (Object-Type 1) is illustrated in accordance with an embodiment of the present invention.

Referring now to FIG. 1(b) a format of new objects referred to as a branch object body for IPv6 (Object-Type 2) is illustrated in accordance with an embodiment of the present invention.

Figure 1C:
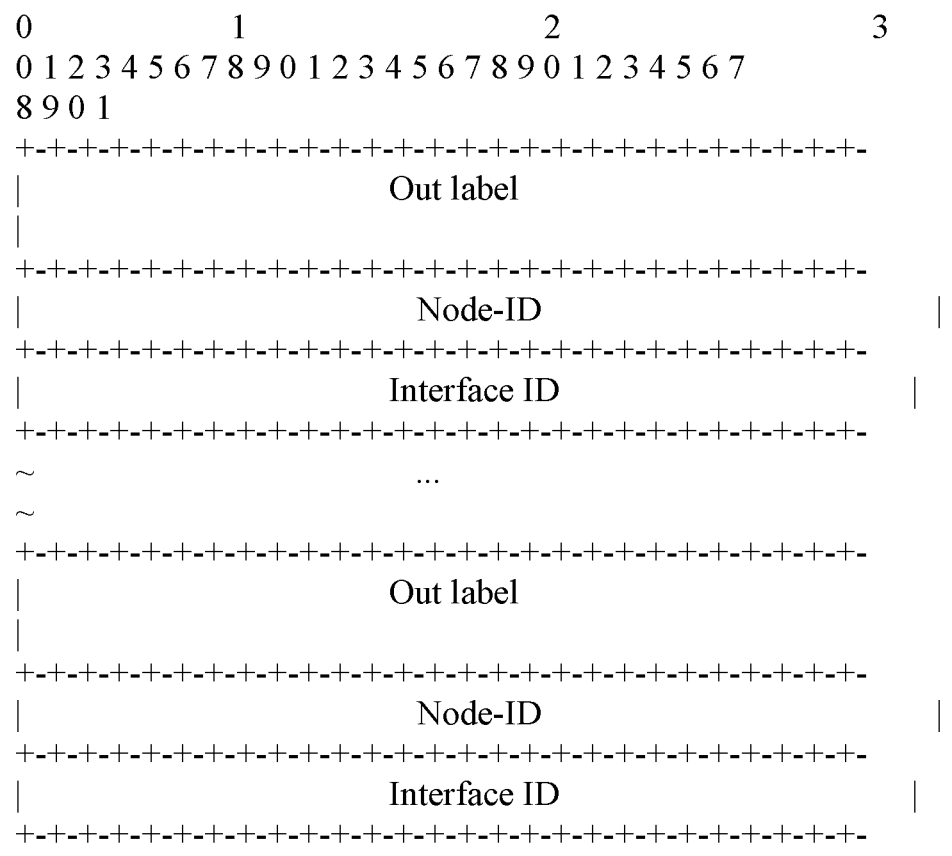

Referring now to FIG. 1(c) a format of new objects referred to as a branch object body for unnumbered (Object-Type 3) is illustrated in accordance with an embodiment of the present invention.

Figure 2:
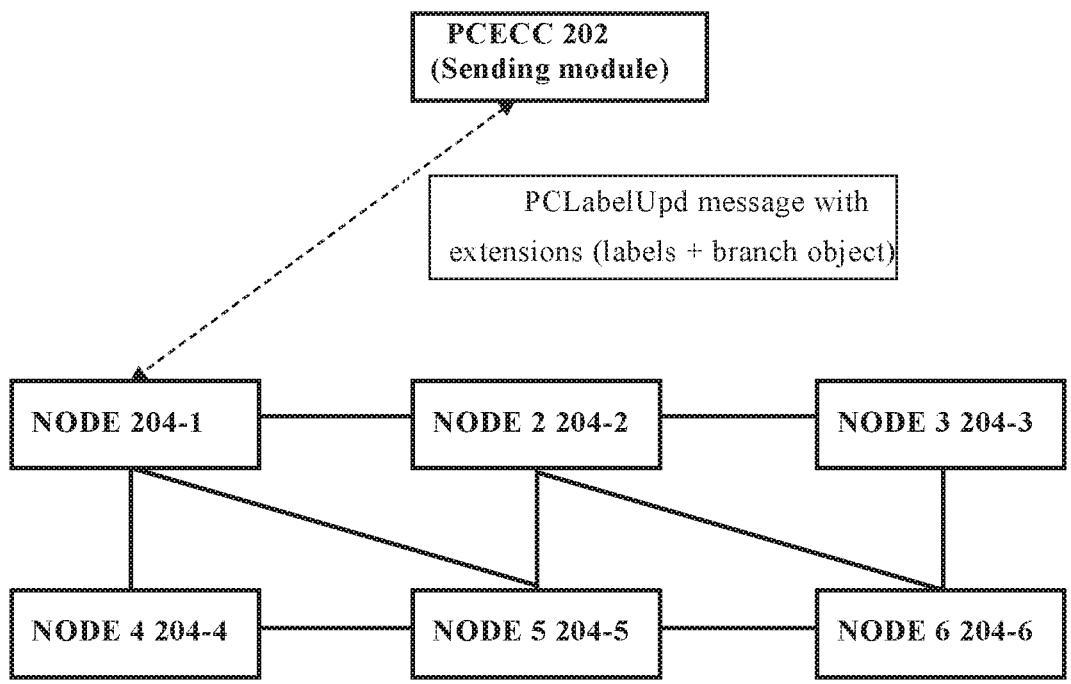
FIG. 2 illustrates a network implementation showing PCECC communication, in accordance with an embodiment of the present subject matter.

Referring now to FIG. 2, a network implementation showing PCECC communication, in accordance with an embodiment of the present subject matter. In one implementation, as shown in FIG. 2, the present invention discloses a network implementation showing PCECC communication, in accordance with an embodiment of the present subject matter. The network comprises at least one PCECC and at least one node in communication with each other.

Although the present invention is explained considering that the present invention is implemented as nodes or PCC or apparatus in a communication network, it may be understood that the nodes or PCC or apparatus may also be implemented in a variety of computing systems, such as a laptop computer, a desktop computer, a notebook, a workstation, a mainframe computer, a server, a network server, and the like. It will be understood that there may be plurality of nodes or PCC or apparatus selected from 204-1, 204-2 . . . 204-N, collectively referred to as node/PCC/apparatus 204 hereinafter. Examples of the node 204 may include, but are not limited to, any sensor node/device that may include a portable computer, a personal digital assistant, a handheld device, sensors, routers, gateways and a workstation. The node 204 and the PCECC 202 are communicatively coupled with each other through a network (not shown).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one implementation, a node or a PCC 204 receives a PCLabelUpd message with all the extensions and a new object from PCECC 202.

Referring now to FIG. 3(a), a path computation client (PCC) is illustrated, in accordance with an embodiment of the present subject matter. The PCC 204 may include a processor 302, an interface 304, and a memory 306. The processor 302 may be implemented as one or more microprocessors, microcomputers, microcontrollers, digital signal processors, central processing units, state machines, logic circuitries, and/or any nodes that manipulate signals based on operational instructions. Among other capabilities, the at least one processor is configured to fetch and execute computer-readable instructions or modules stored in the memory 306.

The interface (I/O interface) 304, may include a variety of software and hardware interfaces, for example, a web interface, a graphical user interface, and the like. The I/O interface may allow the database system, the first node, the second node, and the third node to interact with a user directly. Further, the I/O interface may enable the path computation client (PCC) 204 to communicate with other nodes or nodes, computing nodes, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of nodes to one another or to another server. The I/O interface may provide interaction between the user and the path computation client (PCC) 204 via, a screen provided for the interface.

The memory 306 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include plurality of instructions or modules or applications to perform various functionalities. The memory includes routines, programs, objects, components, data structures, etc., which perform particular tasks or implement particular abstract data types.

In one implementation, a path computation client (PCC) 204 is disclosed. The path computation client (PCC) 204 comprises a processor 302, and a memory 306 coupled to the processor 302 for executing a plurality of modules present in the memory 306. The plurality of modules comprises a receiving module 308, a decoding module 310, and a fetching/downloading module 312.

In one implementation, the receiving module 308 is configured to receive at least one packet containing at least one label and at least a branch object. The decoding module 310 is configured to decode the branch object received to identify if the downloading of labels is corresponding to a Point-to-multipoint traffic engineering label switch path (P2MP TE LSPs), and operate as a branch node for the label switch path received in the packet. The fetching/downloading module 312 is configured to fetch at least one outgoing label specified in the branch object and associated with at least a next hop address of at least one corresponding node on the P2MP TE LSPs.

Figure 3:
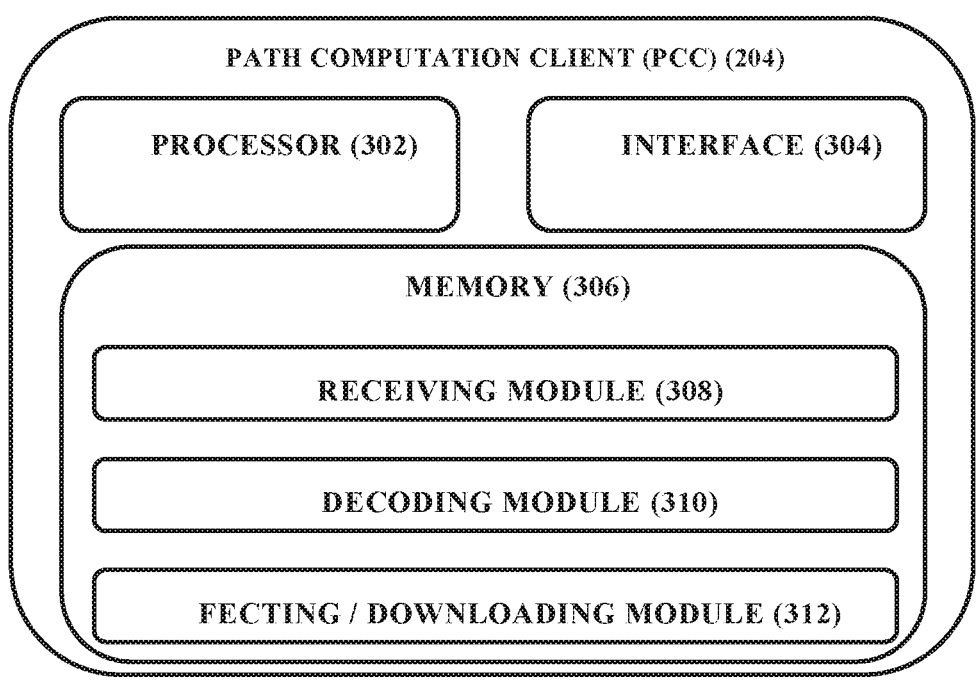
FIG. 3(a) and FIG. 3(b) illustrates a PCC/apparatus/device/node, in accordance with an embodiment of the present subject matter.
Figure 3:
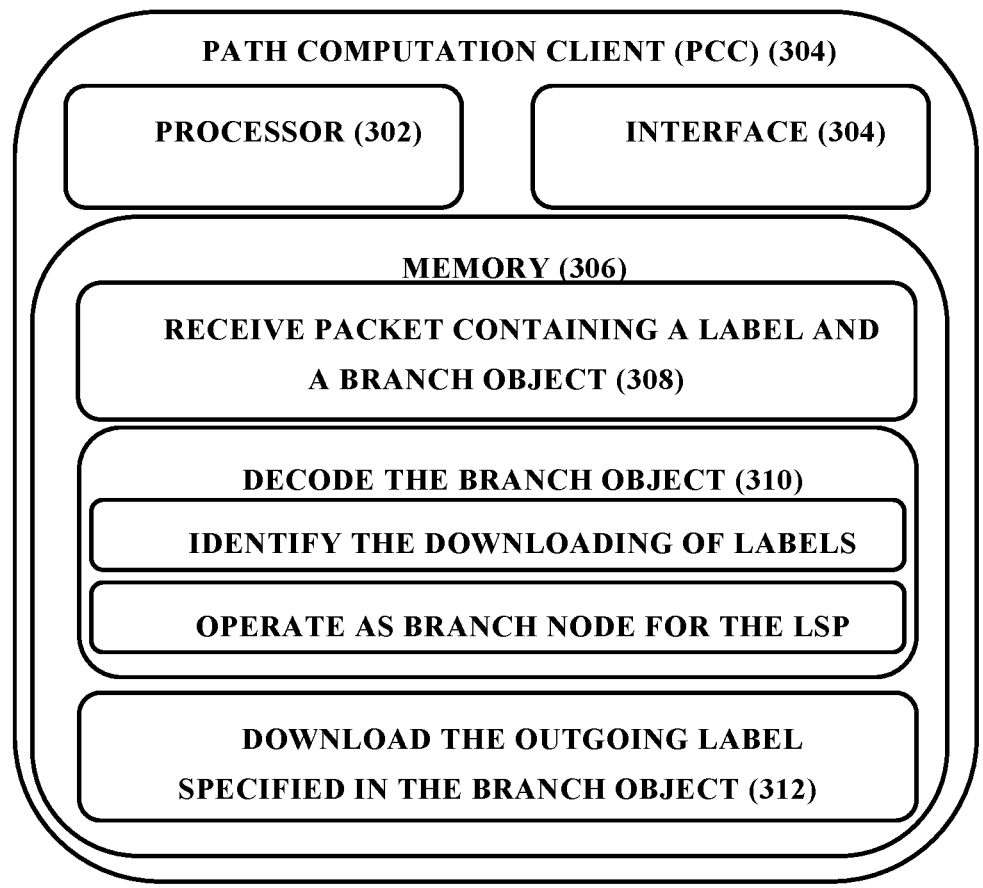

Referring now to FIG. 3(*b*), a path computation client (PCC) 204 is illustrated, in accordance with an embodiment of the present subject matter. In one implementation, a path computation client (PCC) 204 is disclosed. The path computation client (PCC) 204 comprises a processor 302, and memory 306 coupled to the processor for executing a plurality of programs present in the memory 306, wherein the programming, when executed by the processor, configures the PCC to receive 308 at least one packet containing at least one label and at least a branch object; decode 310 the branch object received to identify if the downloading of labels is corresponding to a point-to-multipoint traffic engineering label switch path (P2MP TE LSPs), and operate as a branch node for the label switch path received in the packet and thereby fetch 312 at least one outgoing label specified in the branch object and associated with at least a next hop address of at least one corresponding node on the P2MP TE LSPs. Here, PCECC sends message to PCC (node).

In one implementation, the PCECC is configured to send at least one packet containing at least one label and at least a branch object by means of a sending module.

In one implementation, an apparatus comprising a path computation client (PCC) is disclosed. The PCC is configured to receive 308 at least one packet containing at least one label and at least a branch object; decode 310 the branch object received to identify if the downloading of labels is corresponding to a point-to-multipoint traffic engineering label switch path (P2MP TE LSPs), and operate as a branch node for the label switch path received in the packet and thereby fetch 312 at least one outgoing label specified in the branch object and associated with at least a next hop address of at least one corresponding node on the P2MP TE LSPs. Here, the PCECC send the packet to PCC.

In one implementation, the PCECC is configured to send at least one packet containing at least one label and at least a branch object by means of sending module and encoded by means of an encoding module.

In one implementation, an apparatus, preferably a path computation client (PCC), for at least one path computation element protocol (PCEP) extensions for at least one path computation element central controller (PCECC) with Point-to-multipoint (P2MP) capability in downloading the labels for branch node of point-to-multipoint traffic engineering label switch path (P2MP TE LSPs) is disclosed. The PCC is adapted to receive 308 at least one packet containing at least one label and at least a branch object; decode 310 the branch object received to identify if the downloading of labels is corresponding to a point-to-multipoint traffic engineering label switch path (P2MP TE LSPs), and operate as a branch node for the label switch path received in the packet and thereby fetch 312 at least one outgoing label specified in the branch object and associated with at least a next hop address of at least one corresponding node on the P2MP TE LSPs.

In one implementation, the PCE is adapted to transmit at least one packet containing at least one label and at least a branch object, the packet is transmitted by means of sending module in the form of an encoded packet, encoded by means of an encoded module.

In one implementation, the packet is a PCLabelUpd message, the PCLabelUpd message comprise a PCLabelUpd message format configured to specify the labels and a corresponding action associated with the label using the branch object for a point-to-multipoint traffic engineering label switch path (P2MP TE LSPs).

In one implementation, the label is a multiprotocol label switching (MPLS) label.

In one implementation, the branch object is configured to carry at least one outgoing label, encoded in the packet, associated with at least a next hop address of at least one corresponding node in the network.

In one implementation, the PCC 204 downloads the labels associated with at least one corresponding node in the network of point-to-multipoint traffic engineering label switch path (P2MP TE LSPs).

In one implementation, the PCC 204 download the labels specified in the branch object to data plane for a P2MP TE LSP. In one implementation, download here refers to storing in data plane. This operation is performed by PCC (Node) on decoding the PCLabelUpd message received from PCE, and store the label information in the data plane.

In one implementation, the packet is received by the PCC 204 preferably from at least one path computation element central controller (PCECC) 202. Here, PCECC sends message to PCC (node), wherein the PCC is path computation client.

Figure 4:
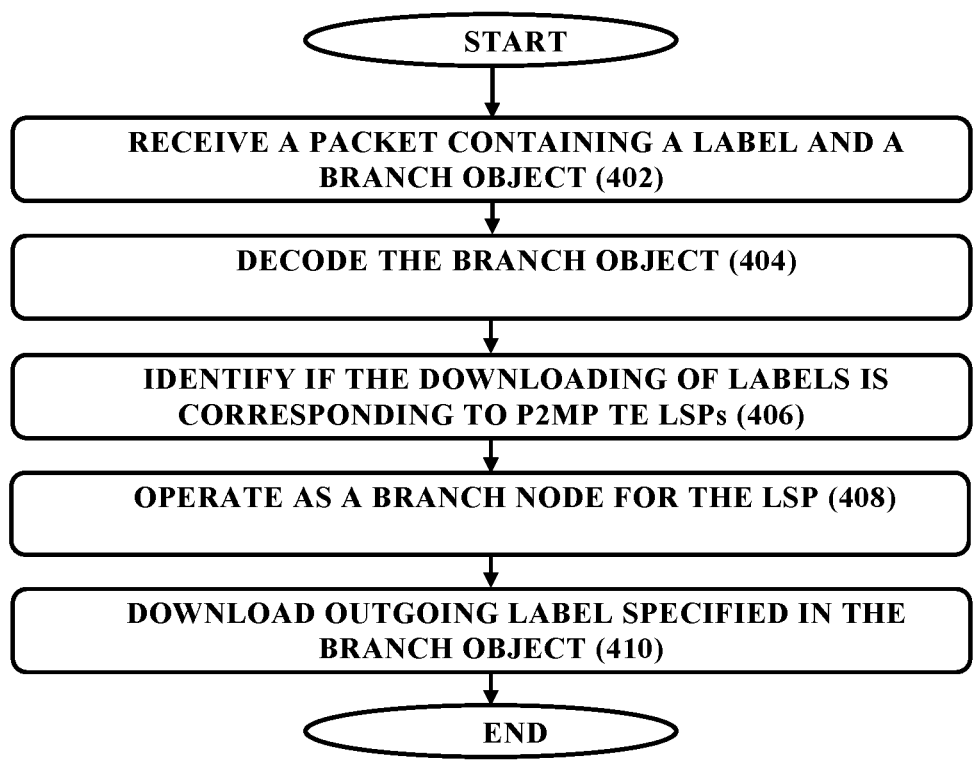
FIG. 4 illustrates a method implemented by the PCC/apparatus/device/node to achieve PCECC communication, in accordance with an embodiment of the present subject matter.

Referring now to FIG. 4, a method implemented by the PCE/apparatus/device/node to achieve PCECC communication is illustrated, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described PCC 204.

At block 402, at least one packet containing at least one label and at least a branch object is received by the PCC 204. The packet is received preferably from at least one path computation element central controller (PCECC) 202. In one implementation, the packet is a PCLabelUpd message, the PCLabelUpd message comprise a PCLabelUpd message format configured to specify the labels and a corresponding action associated with the label using the branch object for a point-to-multipoint traffic engineering label switch path (P2MP TE LSPs). The label is a Multiprotocol Label Switching (MPLS) label.

In one implementation, the PCECC 202 is adapted to transmit at least one packet containing at least one label and at least a branch object to PCC.

In one implementation, the branch object is configured to carry at least one outgoing label, encoded in the packet, associated with at least a next hop address of at least one corresponding node in the network.

At block 404, the branch object from the received packet is decoded.

At block 406, the downloading of labels is corresponding to a Point-to-multipoint traffic engineering label switch path (P2MP TE LSPs) is identified form the branch object.

At block 408, upon identification, the PCC 204 operates as a branch node for the label switch path received in the packet.

At block 410, at least one outgoing label specified in the branch object and associated with at least a next hop address of at least one corresponding node on the P2MP TE LSPs is fetched and/or downloaded.

In one implementation, the labels associated with at least one corresponding node in the network of point-to-multipoint traffic engineering label switch path (P2MP TE LSPs) are downloaded.

In one implementation, the labels specified in the branch object to data plane for a P2MP TE LSP are downloaded.

Apart from what is discussed above, the present invention has some additional advantages and technical benefits, as provided below:

A PCECC basic mode in setting up P2MP TE LSPs can be achieved.

PCEP extensions to support PCECC with P2MP capability in downloading the labels for the branch node of P2MP TE LSPs using new objects and the extensions of the message.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for multicast (P2MP) support for path computation element central controller (PCECC) have been described in language specific to structural features and/or methods, it is to be understood that the appended claims are not necessarily limited to the specific features or methods described. Rather, the specific features and methods are disclosed as examples of implementations of the multicast (P2MP) support for path computation element central controller (PCECC).

The invention claimed is:

1. A path computation client (PCC), wherein the PCC operates as a branch node along a point-to-multipoint label switch paths (P2MP LSPs), comprising:
   a non-transitory memory comprising programs; and
   a processor coupled to the processor, wherein the processor is configured to execute the programs to:
      receive one packet containing an object, wherein the object comprises at least two outgoing labels;
      obtain a first outgoing label of the at least two outgoing labels, wherein the first outgoing label is associated with node information of a first next hop node of the branch node along the P2MP LSPs; and
      obtain a second outgoing label of the at least two outgoing labels, wherein the second outgoing label is associated with node information of a second next hop node of the branch node along the P2MP LSPs.

2. The PCC as claimed in claim 1, wherein the node information comprises a next hop address.

3. The PCC as claimed in claim 1, wherein the node information comprises node identifier (ID) and interface ID.

4. The PCC as claimed in claim 1, wherein the packet is a path computation element communication protocol (PCEP) message, wherein the PCEP message comprises a PCEP message format configured to specify the at least two outgoing labels and a corresponding action associated with the at least two outgoing labels for the P2MP TE LSPs.

5. The PCC as claimed in claim 1, wherein the processor is configured to execute the programs to:
   receive a multicast packet;
   send the multicast packet to the first next hop node based on the first outgoing label;
   send the multicast packet to the first next hop node based on the second outgoing label.

6. The PCC as claimed in claim 1, wherein the at least two outgoing labels are multiprotocol label switching (MPLS) labels.

7. The PCC as claimed in claim 1, wherein the packet is received from at least one path computation element central controller (PCECC).

8. The PCC as claimed in claim 1, wherein the processor is further configured to download all the outgoing labels specified in the object.

9. The PCC as claimed in claim 1, wherein the processor is further configured to download the at least two outgoing labels specified in the object to data plane.

10. The PCC as claimed in claim 1, wherein the packet comprises an incoming label, the processor is further configured to:
    obtain a first forwarding entry comprising the incoming label and the first outgoing label for forwarding a multicast packet to the first next hop node; and
    obtain a second forwarding entry comprising the incoming label and the second outgoing label for forwarding the multicast packet to the second next hop node.

11. The PCC as claimed in claim 1, wherein the packet is configured to instruct the PCC to act as a branch node along the P2MP LSPs.

12. A communication method, implemented by a path computation client (PCC), wherein the PCC operates as a branch node along a point-to-multipoint label switch paths (P2MP LSPs), the method comprises:
    receiving one packet containing an object, wherein the object comprises at least two outgoing labels;
    obtaining a first outgoing label of the at least two outgoing labels, wherein the first outgoing label is associated with node information of a first next hop node of the branch node along the P2MP LSPs; and
    obtaining a second outgoing label of the at least two outgoing labels, wherein the second outgoing label is associated with node information of a second next hop node of the branch node along the P2MP LSPs.

13. The method as claimed in claim 12, wherein the node information comprises a next hop address.

14. The method as claimed in claim 12, wherein the node information comprises node identifier (ID) and interface ID.

15. The method as claimed in claim 12, wherein the packet is a path computation element communication protocol (PCEP) message, the PCEP message comprises a PCEP message format configured to specify the at least two outgoing labels and a corresponding action associated with the at least two outgoing labels for the P2MP TE LSPs.

16. The method as claimed in claim 12, wherein the method further comprises:
    receive a multicast packet;
    send the multicast packet to the first next hop node based on the first outgoing label;
    send the multicast packet to the first next hop node based on the second outgoing label.

17. The method as claimed in claim 12, wherein the at least two outgoing labels are Multiprotocol Label Switching (MPLS) labels.

18. The method as claimed in claim 12, wherein the packet is received from at least one path computation element central controller (PCECC).

19. The method as claimed in claim 12, wherein the method further comprises:
    downloading all outgoing labels specified in the object to data plane.

20. The method as claimed in claim 12, wherein the packet further comprises an instruction, and wherein the method further comprises:

acting as a branch node along the P2MP LSPs according to the instruction of the packet.

21. The method as claimed in claim 12, wherein the packet comprises an incoming label, the method further comprises:

obtain a first forwarding entry comprising the incoming label and the first outgoing label for forwarding a multicast packet to the first next hop node;

obtain a second forward entry comprising the incoming label and the second outgoing label for forwarding the multicast packet to the second next hop node.

22. A communication method, implemented by a path computation element central controller (PCECC), the method comprises:

generating a packet containing an object, wherein the object comprises at least two outgoing labels, wherein the at least two outgoing labels comprise a first outgoing label and a second outgoing label, the first outgoing label being associated with node information of a first next hop node of a branch node along a point-to-multipoint label switch paths (P2MP LSPs), and the second outgoing label being associated with node information of a second next hop node of the branch node; and sending the packet to the branch node.

23. The method as claimed in claim 22, wherein the node information comprises a next hop address.

24. The method as claimed in claim 22, wherein the node information comprises node identifier (ID) and interface ID.

25. The method as claimed in claim 22, wherein the packet is a path computation element communication protocol (PCEP) message, wherein the PCEP message comprises a PCEP message format configured to specify the at least two outgoing labels and a corresponding action associated with the at least two outgoing labels for the P2MP LSPs.

26. The method as claimed in claim 22, wherein the at least two outgoing labels are Multiprotocol Label Switching (MPLS) labels.

27. A path computation element central controller (PCECC), comprising:

a non-transitory memory comprising programs; and a processor coupled to the processor, wherein the processor is configured to execute the programs to:

generate a packet containing an object, wherein the object comprises at least two outgoing labels, wherein the at least two outgoing labels comprises a first outgoing label and a second outgoing label, the first outgoing label being associated with node information of a first next hop node of a branch node along a point-to-multipoint label switch paths (P2MP LSPs), and the second outgoing label being associated with node information of a second next hop node of the branch node; and send the packet to the branch node.

28. The PCECC as claimed in claim 27, wherein the node information comprises a next hop address.

29. The PCECC as claimed in claim 27, wherein the node information comprises node identifier (ID) and interface ID.

30. The PCECC as claimed in claim 27, wherein the packet is a path computation element communication protocol (PCEP) message, wherein the PCEP message comprises a PCEP message format configured to specify the at least two outgoing labels and a corresponding action associated with the at least two outgoing labels for the P2MP LSPs.

* * * * *